Aug. 7, 1956 W. SIEGERIST ET AL 2,757,707
ROTARY BAR AND TUBE STRAIGHTENER
Filed June 30, 1952 5 Sheets-Sheet 4
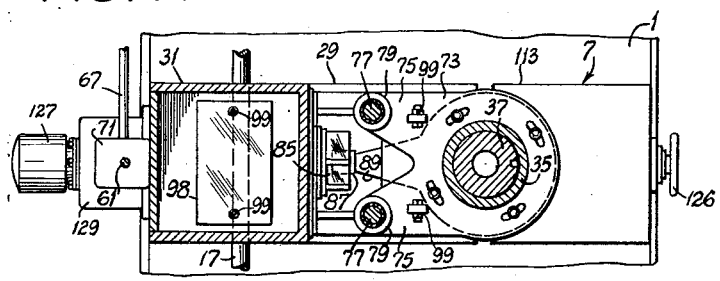
FIG. 5.
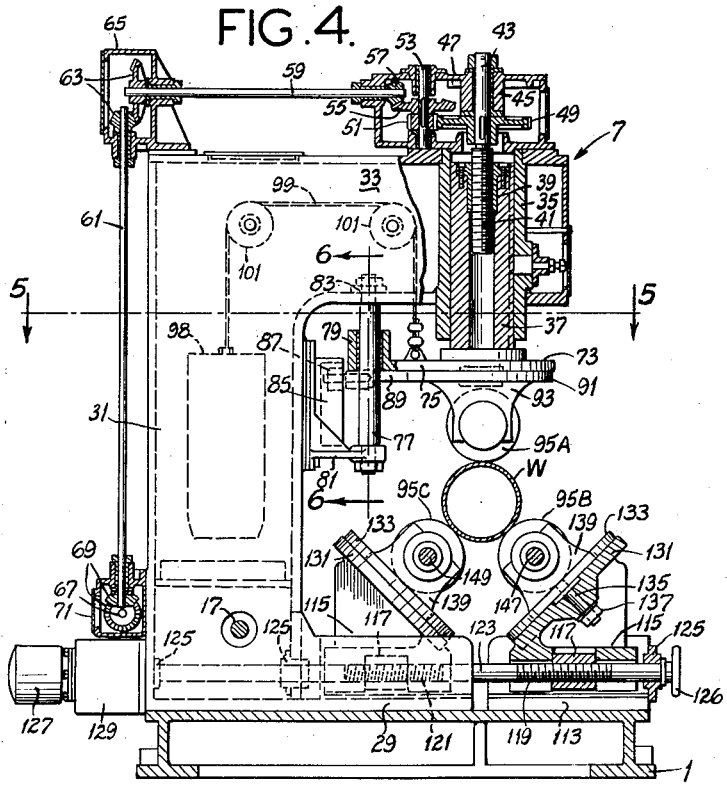
FIG. 4.
FIG. 6.
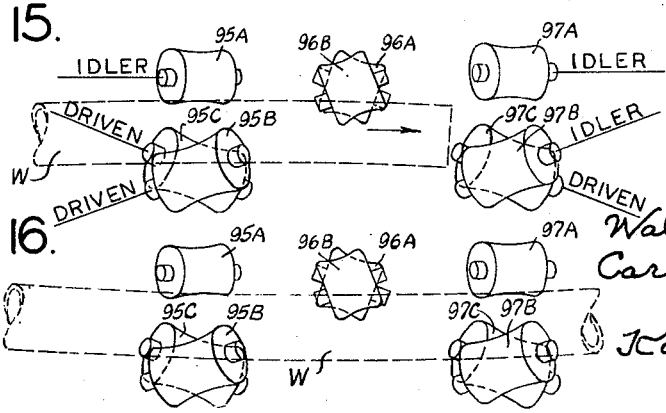
FIG. 15.
FIG. 16.
Walter Siegerist,
Carl J. Didden,
Inventors,
Koenig and Pope,
Attorneys.

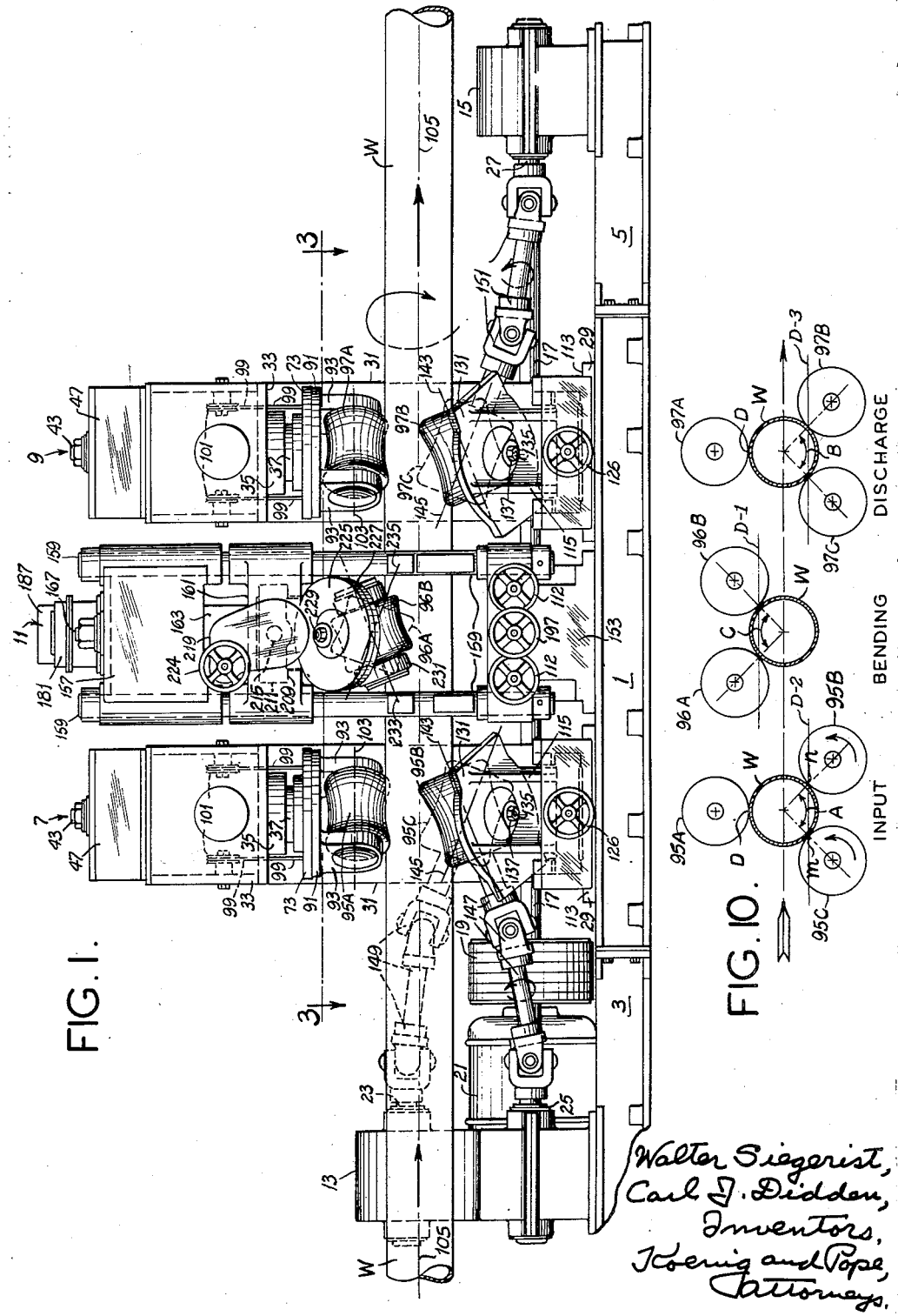

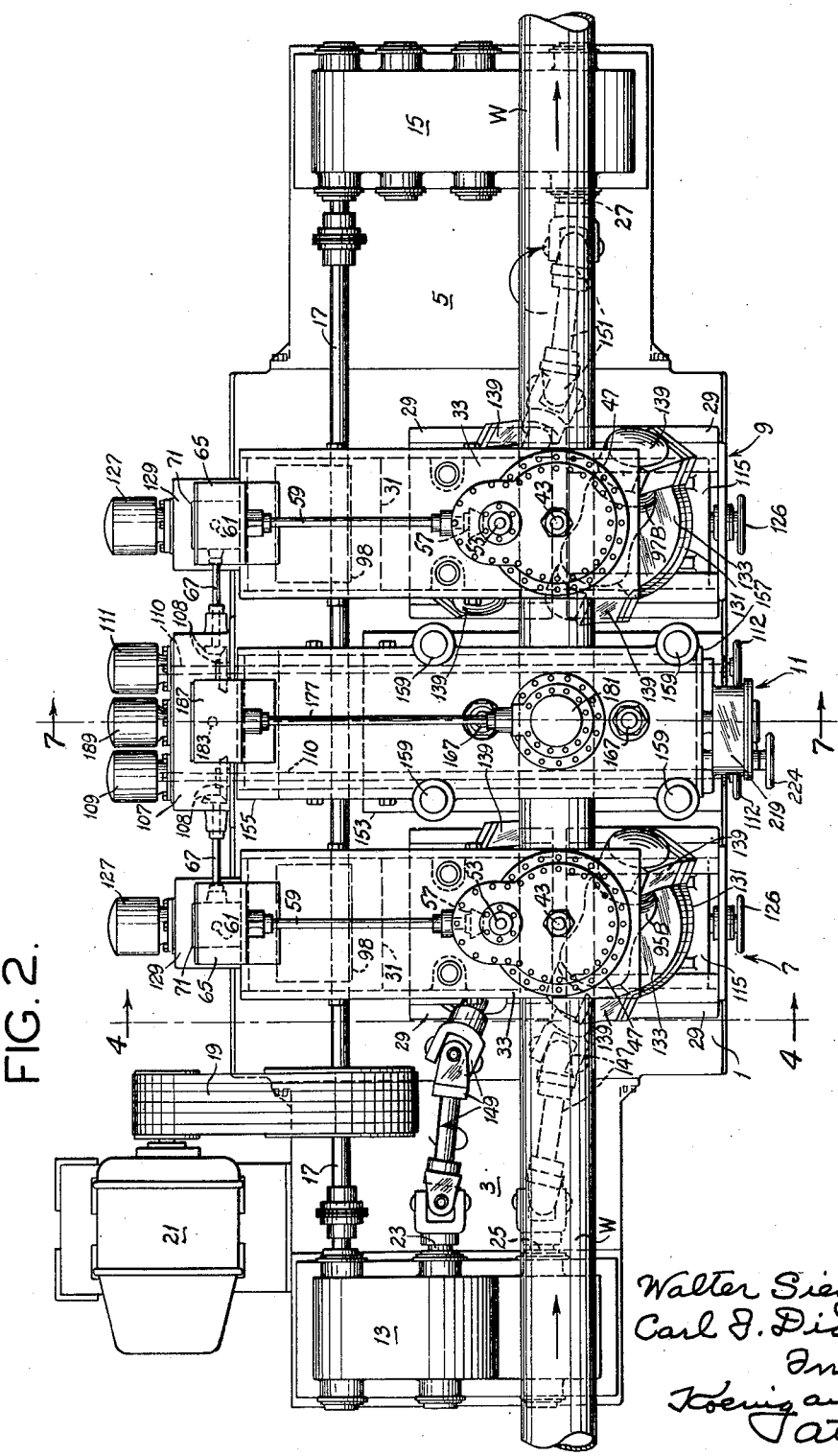

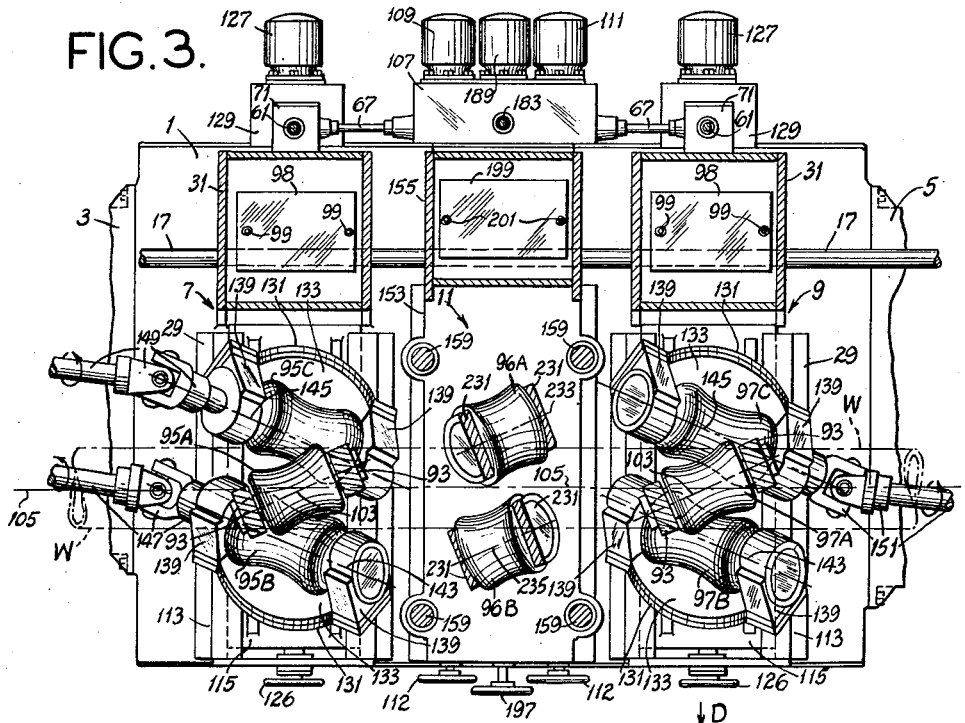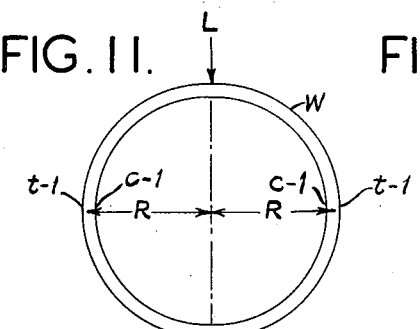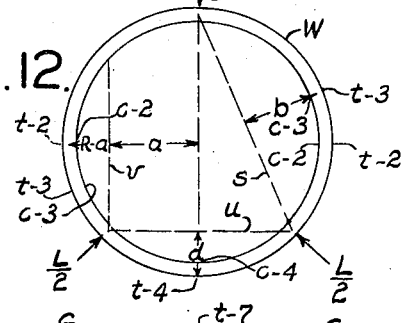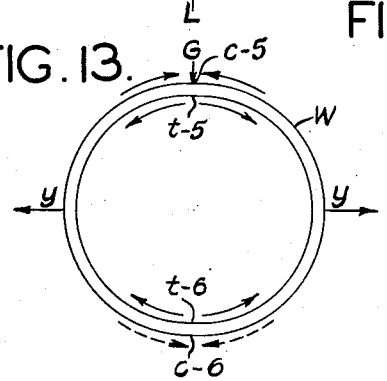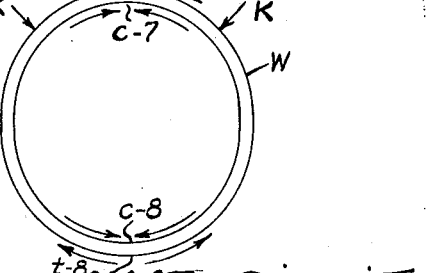

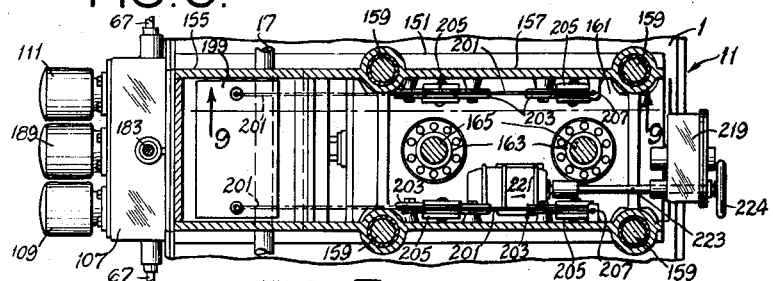

United States Patent Office 2,757,707
Patented Aug. 7, 1956

2,757,707

ROTARY BAR AND TUBE STRAIGHTENER

Walter Siegerist, Richmond Heights, and Carl J. Didden, St. Louis, Mo., assignors, by direct and mesne assignments, to Blaw-Knox Company, Pittsburgh, Pa., a corporation of Delaware Application June 30, 1952, Serial No. 296,300

4 Claims. (Cl. 153—91)

This invention relates to rotary bar and tube straighteners, and more specifically to skew-roll straighteners of this class for straightening, polishing and sizing of round stock.

Among the several objects of the invention may be noted the provision of a high-speed rotary straightener which is capable not only of straightening solid stock of round section and tubular stock having comparatively thick walls, but also tubular stock having comparatively thin walls, without damage to the surface of the stock and without damaging deformation of its cross section; the provision of apparatus of the class described which for a given wall thickness of tube can successfully straighten material of substantially larger diameters than heretofore possible; the provision of apparatus of this class which will successfully straighten both circular bars and pipes composed of softer materials than could heretofore be straightened by such apparatus, including (but without limitation) materials such as uranium, magnesium, aluminum, et cetera; and the provision of apparatus of the class described which is flexible in application to a large range of materials and sizes of stock. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a front elevation of my new apparatus;

Fig. 2 is a plan view of Fig. 1;

Fig. 3 is a horizontal section taken on line 3—3 of Fig. 1, displaying certain roll arrangements;

Fig. 4 is a vertical section taken on line 4—4 of Fig. 2 and showing an input feeding roll stand;

Fig. 5 is a horizontal section taken on line 5—5 of Fig. 4;

Fig. 6 is a detail vertical section taken on line 6—6 of Fig. 4;

Fig. 7 is a vertical section taken on line 7—7 of Fig. 2, showing a bending roll stand;

Fig. 8 is a horizontal section taken on line 8—8 of Fig. 7;

Fig. 9 is a cross section taken on line 9—9 of Fig. 8;

Fig. 10 is a series of diagrammatic cross sections illustrating roll operations at input, bending and discharge stations;

Figs. 11, 12, 13 and 14 are schematic views comparing certain characteristics of our new roll straightener with the corresponding characteristics of prior roll straighteners; and, Figs. 15 and 16 are exaggerated schematic views illustrating certain events in straightening operations.

It is to be noted that Fig. 4, besides illustrating an input feeding roll stand as above specified, also sufficiently represents a corresponding output discharge roll stand to be described, and which has identical parts, the only differences relating to certain drive connections. The indexing on Fig. 4 therefore applies both to the input and output roll stands, except as to the differences to be noted.

Corresponding reference characters indicate corresponding parts throughout the several views of the drawings.

Hereinafter eight straightening rolls will be referred to, some of which are powered and act both to supply pressure to, and as drivers for, cylindrical stock to be straightened, and others of which act simply as reactive idlers. The surfaces of the rolls, whether drivers or idlers, are per se as known hyperboloid or modified hyperboloid forms, the details of which require no further elaboration herein. Such forms constitute what are sometimes called by the shorter name of skew surfaces, and all the rolls will therefore be referred to either as skew rolls, or simply rolls. The primary characteristics of such rolls are that they can engage a cylinder on substantially linear areas substantially lengthwise of it and parallel to its axis.

Figs. 4, 7 and 10 are constructed on sections taken perpendicular to the axes of the workpieces passing through the machine. The skew rolls through which said sections pass are located angularly to that axis. These cross sections therefore traverse the rolls at angles. To show the resulting complex angular roll sections would render obscure that which can be made more clear by showing the roll cross sections diagrammatically, as has been done. The essential regions of contact between the rolls and work are accurately shown. Where bias cross sections are not involved, the actual roll shapes are shown (see Figs. 1–3, 15 and 16).

Known conventional straighteners were of the five-roll type which had a pair of input feeding rolls and a pair of output discharge rolls. The rolls of each pair were located 180° apart. Between the pairs were located a top pressure roll, used to impose the bending load that performs the straightening operation. All upper rolls were idlers; only the respective bottom rolls of the input and output pair were driven. This arrangement had limitations even in connection with hard steel stock in the smaller sizes, and ordinarily excluded the use of the arrangement upon softer materials and/or larger sections, particularly such as had comparatively thin walls. Herein, a comparatively thin-walled tube means one in which the ratio of diameter to wall thickness is a large number. The larger the number, the weaker the tube is for a given strength of material composing it.

Thus former machines of this type were limited to operating upon relatively hard and strong bar or tube stock, so that the resistance to crushing between the rolls might be sufficient (without damage to the workpiece) to bring about a positive rotation of the workpiece in order that it might be surely driven through the straightener without slippage and resulting damage. For softer materials, and even harder materials made in larger thin-wall tube sections, the local deformations at the input and output rolls produced an inferior or sometimes an unusable product, and at the least prevented a sufficient grip upon the stock for positively driving it through straightening operations at desirable speeds.

Stock that is most difficult to straighten requires the greatest torque. High roll pressures were required in the former machines to provide the torque, since only one roll in each of the input and output pairs provided the traction required for rotation. According to our invention, we provide more traction points under lower surface pressure at any one point. Formerly, the load required to obtain sufficient traction at a single point often became too large for the crushing strength of the stock operated upon, and the rolls would roll a spiral path or depression in the wall of the tube. Our invention prevents this result over a wider range of workpiece dimensions.

Moreover, in prior five-roll machines in which the rolls of the input and output pairs were opposite, reliance was placed entirely upon the hyperboloid or skew type of roll shape for preventing rolling out of the work from between the rolls. In other words, the advantages of a three-point support for the workpiece in any given plane were not taken advantage of. This resulted in scuffing due to the resulting pinching action, and caused the workpiece to take shapes which had less favorable relations to the bending roll, with consequent reduction of effective straightening action by the latter.

By means of the present invention this rolling out effect is prevented by reason of the three-point supports obtained in the three-roll input and discharge sets. However, the skew shapes of the rolls ensure more or less of a line contact between rolls and the workpiece extending more or less parallel to the workpiece axis.

Briefly, then, the present invention consists in the use of a three-skew-roll arrangement for both input and output rolls, wherein two of the input rolls are drivers of the workpiece and at least one of the output rolls is driven, there being also employed an intermediate two-skew-roll set of straightening rolls. The lower rolls of each triple set of input and output rolls are preferably located (although variation in this respect is permissible and in some cases desirable) at about 90° intervals with respect to one another and at 135° with respect to the respective top idler roll. The upper bending rolls (between the input and output rolls) are also preferably located (although variation in this respect is permissible and sometimes desirable) at about 90° relative to one another. The result is the ability to apply greater torque to the workpiece at lower contact pressures which are more favorably disposed to avoid deformations, and to bring about a better straightening action. The result is that tubes having comparatively thinner wall sections can be better straightened, polished and sized, as well as tubes of softer materials.

In addition, the invention consists briefly in convenient means for adjusting roll angles, elevations, and spreads, and in the case of the upper idling input and output rolls angles are made a function of the adjusted elevation of these rolls.

Referring now more particularly to the drawings (Figs. 1–3), there is shown at numeral 1 a central bed having extensions 3 and 5. The bed 1 supports three stands, i. e., an input feed roll stand 7, an output discharge roll stand 9 and an intermediate bending roll stand 11. A transmission 13 is carried on the end of the extension 3 and another transmission 15 is carried on the end of the extension 5. A main drive shaft 17 connects the transmissions and is driven by a multiple V-belt drive 19 from a motor 21, supported upon the extension 3.

The transmission 13 has two output shafts 23 and 25. These shafts rotate in the same generally anticlockwise direction as viewed from the left end of the machine, suitable idler gears being used for the purpose in the transmission 13. The transmission 15 has an output shaft 27 which also rotates in the same anticlockwise direction, viewed from the left, as shafts 23 and 25. Again suitable idlers are used for the purpose in the transmission 15. The workpiece W, indicated as a comparatively large and thin-wall tube, is located as shown in Figs. 1–3.

Input roll stand 7 will now be described, and it will be understood that substantially the same description applies to the output roll stand 9. Corresponding reference characters used on both will represent identical parts and exceptions will be noted where appropriate. Referring then to said Figs. 1–3 and additionally Figs. 4 and 5, the roll stand 7 is constituted by a base 29 fastened to the bed portion 1. From this extends an upright hollow column or standard 31 having an overhanging head 33. In this head is a vertical guide 35 for a hollow nonrotary slider 37. A threaded internal bushing 39 is affixed to the slider 37. Threaded into the bushing 39 is a drive screw 41, the upper end of which is formed as a journal 43 in a bearing 45 of a gear box 47. Keyed to and between these parts 41 and 43 is a gear 49 driven by a pinion 51 on a countershaft 53 in the gear box 47. A bevel gear 55 keyed to shaft 53 is driven by a bevel pinion 57 from shaft 59. Shaft 59 is driven from shaft 61 through bevel gears 63 in another gear box 65. Shaft 61 is driven from shaft 67 through a bevel gear train 69 located in a gear box 71. Thus by rotating shaft 67, slider 37 may be raised or lowered.

The slider 37 carries a crosshead platen 73 which includes legs 75 having sliding connections 79 with two guide posts 77. The guide posts are attached to the column 31 and head 33, as indicated at 81 and 83. Carried on the fastener 81 is a translation cam 85 in the slot of which is a follower roller 87 (Figs. 4 and 6). This roller is carried on the end of an arm 89 which forms an extension from a rotary turret 91 having a rotary attachment with the crosshead platen 73. This turret carries spaced pillow blocks 93 for the journals of an upper idler input roll 95A in the case of stand 7, or upper output idler roll 97A in the case of stand 9. The rolls 95A and 97A are identical except that 95A belongs to the input roll stand 7 and 97A belongs to the output stand 9. The weight of slider 37 and attached parts is counterbalanced by a weight 98 connected to the crosshead platen 73 by cables 99 borne on pulleys 101 which are located in the head 33. From the above it will be clear that by rotating the shafts 67, the screws 41 of the roll stands 7 and 9 may be rotated to raise or lower the respective rolls 95A and 97A. These rolls, being constructed as modified hyperboloids of revolution, have their approximately straight-line generating elements approximately engaging along the axial straight-line generating elements of the cylindric workpiece, at least in a mean position of the roll axis relative to the workpiece axis.

As the axes 103 of rolls 95A and 97A are raised, the angles become greater, and as they are lowered, the angles become smaller. The purpose of this is to accommodate the apparent curvatures of the rolls, viewed along the workpiece axis to the right-circular-sections of various workpieces to be accommodated. Thus larger diameters of workpieces, which require raising of the rolls 95A and 97A, also require that the angles of the vertical planes of the axes 103 of these rolls be increased with respect to the axis 105 of the workpiece W and, per contra, smaller diameters of workpieces which require lowering of the rolls 95A and 97A, also require that the angles of the vertical planes of the axes 103 of these rolls be decreased with respect to the vertical plane of axis 105 of the workpiece W. The follower rollers 87 for cams 85 automatically accomplish this angling through arms 89 and turrets 91, through raising and lowering of the crosshead platens 73.

It will be noted from Figs. 2 and 3 that the control shafts 67 enter a gear box 107. By a bevel gear train 108 in box 107, shaft 67 for roll stand 7 is driven by a reversible motor 109. The motor shaft 110 extends forward across the machine to receive a hand control wheel 112. By the same type of drive 108, 110 in box 107, the shaft 67 for roll stand 9 is driven by a reversible motor 111. The shaft of this motor also extends across the machine to receive a second hand control wheel 112.

Opposite the base 29 of each roll stand 7 and 9 is an auxiliary base 113. Bases 29 and 113 are formed as coaxial guides for crossheads 115, which carry nuts 117 engaging with right- and left-hand threads 119 and 121 on a control shaft 123. The latter is supported in bearings 125. The shaft 123 may be rotated from a reversible motor 127 driving through a gear box 129 or from a hand control wheel 126. Thus, by rotation of the shaft 123 one way or another, the crossheads 115 may be caused to move toward and from one another. The crossheads 115 carry angled platens 131. The platens carry turrets 133 which are rotary on pins such as 135. Any rotary adjustment with respect to a given pin 135 may be maintained by tightening a nut 137 threaded on it. Each turret 133 carries a pair of spaced pillow blocks 139 for roll journals. As to roll stand 7, the outer roll is indexed 95B and the inner one 95C. As to roll stand 9, the outer roll is indexed 97B and the inner one 97C. The axes 145 of rolls 95C and 97C are each at the same angle to the axis 105.

Roll 95B on stand 7 is driven from shaft 25 by means of a conventional splined double universal drive 147. Roll 95C on stand 7 is driven from shaft 23 by a conventional splined double universal drive 149. The roll 97C on stand 9 is driven by a conventional splined double universal drive 151. Roll 97B on stand 9 is an idler, as are upper roll 97A on stand 9 and upper roll 95A on stand 7.

The bending roll stand assembly 11 shown in Figs. 1, 3, 7, 8 and 9 will now be described. This consists of a base 153 on the bed portion 1, having an upright column or standard 155 from which extends a head 157. Four guide posts 159 connect the base 153 with the head 157. Guided for vertical movement on the posts 159 is a crosshead 161. The crosshead has fastened to it two oppositely threaded bushings 163 engaged by screws 165. The screw parts include journals 167 in bearings 169, located in the head 157. Keyed to the connecting parts between the screws and journals are gears 171, driven by a common pinion 173 on a shaft 175. Shaft 175 is driven from a shaft 177 through a bevel gear set 179 in a gear box 181. Shaft 177 is driven from shaft 183 through a bevel gear set 185 in a gear box 187 and shaft 183 is driven by a reversible motor 189 through a bevel gear set 191 in the gear box 107. The motor shaft 195 is extended for hand control from a hand control wheel 197 at the front of the machine. Thus by means of either the motor 189 or the handwheel 197 the screws 165 may be turned so as to elevate or lower the crosshead 161. The crosshead and attached parts are counterweighted by weight 199 attached to cables 201, which are threaded over sheaves 203, all attached to the head 157, and pulleys 205, both attached to the crosshead 161. The other ends of the cables are anchored to the head 157 as shown at 207.

The crosshead 161 forms a guide 209 crosswise of the axis of the workpiece. This guide carries sliders 211 in which are fixed bushings 213. A right- and left-hand screw 215 engages right- and left-hand threads in the respective bushings 213 for adjusting distance between the crossheads 211. The screw 215 is driven through a gear train 217 in a gear box 219, this in turn being driven by a motor 221 through shaft 223. At the end of shaft 223 is a hand control wheel 224. The motor 221 is carried upon the crosshead 161, as indicated in Fig. 8.

Each slider 211 carries an angled platen 225. Rotary turrets 227 are carried on the platens and are adapted to be locked in any rotary positions by means of center studs and lock nuts such as shown at 229. Each turret carries a pair of pillow blocks 231. These pillow blocks support journals of bending idler rolls 96A and 96B, which are also of the modified hyperboloid form described in connection with rolls 95A, 95B, 95C and 97A, 97B, 97C.

Operation is as follows:

The lower rolls 95B, 95C and 97B, 97C are adjusted to the proper horizontal positions through motors 127 or handwheels 126. The adjustment is preferably made so that the effective working contacts between the respective pairs of rolls and the workpiece are approximately at the 90° interval shown at A and B in Fig. 10.

Next the idler rolls 95A and 97A are vertically adjusted through use of motors 109 and 111, so as to provide line pressure contacts when a workpiece enters, as shown at D in Fig. 10. The lines D, which appear in end views in Fig. 10, are collinear. The adjustment is such that sufficient pressure is obtained upon the workpiece from rolls 95A, 95B and 95C for a positive input drive on the piece, so as positively to rotate it and advance it into the straightening operation. Likewise, the adjustment for roll 97A is made so as to provide sufficient drive from roll 97C to effect a driving discharge of the workpiece from the straightening operation.

Next the bending rolls 96A and 96B are adjusted for proper separation by use of the motor 221 or handwheel 224, to provide the contact spacing at angle C shown in Fig. 10. Then these rolls 96A and 96B are adjusted in elevation through control of motor 189, to be positioned for applying a bending load on the workpiece.

Figs. 15 and 16, with some exaggeration, show how the straightening operation occurs. Referring to Fig. 15, as the workpiece W is fed in by the input rolls 95A, 95B and 95C, it is forced into contact with the bending rolls 96A and 96B, which are adjusted low enough for the purpose. It is the constant work of this bending action as the workpiece rotates that requires work to be done and substantial torque to be applied by rolls 95B and 95C. Then as the end of the workpiece reaches the output rolls 97A, 97B and 97C, the condition is about as shown in Fig. 16, wherein the rolls 95B and 95C and the roll 97C act as drivers. Pressure reactions occur at idler rolls 95A and 97A and 97B. Rolls 96A and 96B work the piece by bending as it rotates. This works out the original unrelieved stresses which caused it to be crooked. At the same time, a polishing and sizing action occurs. The polishing action comes about due to the differential in surface velocity of the larger diameters of the rolls with respect to the uniform diameter of the workpiece. The fixed positions of the contact lines of the rolls with reference to each other cause the workpiece to conform to the dimensions of the passage through each triple set of input and triple set of output rolls, thereby correcting out of roundness in the workpiece or sizing it.

The output roll arrangement may be identical with the input roll arrangement. For many applications it is not necessary to drive both of the bottom rolls, and this form is illustrated. The only work that the output rolls do is to impart enough turning energy to the workpiece to keep it in motion after the bending action has been substantially completed and the rear end of the workpiece has left rolls 95A, 95B and 95C. Finally the output feed rolls feed the workpiece out of the machine.

It is required to have power rolls 95B, 95C, 97C all synchronized from the single power source 21, to eliminate relative movements between power roll surfaces and the workpiece. This eliminates scuffing.

It will be noted that the axes of all the rolls in each triple set of rolls 95A, 95B, 95C and 97A, 97B, 97C are relatively nonparallel, but axes of corresponding rolls in the two sets such as 95A—97A, 95B—97B and 95C—97C are parallel. Moreover, the axes of the bending rolls 96A and 96B are nonparallel with respect to each other and with respect to the axes of all other rolls. This fact, taken in connection with the fact that each roll contacts the workpiece W along linear areas that are more or less parallel to the workpiece axis 105, results in a strong aligning confinement of the workpiece between the input and discharge rolls, without tendencies such as existed in former five-roll machines of the workpiece tending to roll out from between two oppositely located rolls.

Figs. 10–14 illustrate certain advantages of our eight-roll machine (described herein) over prior five-roll machines. In the present machine there are three triangularly related input rolls which lead the work into the straightening operation and three triangularly related output rolls which lead it out, with two bending rolls. In prior five-roll machines there were two input rolls which led the work into the straightening operation and two output rolls which led it out, with a single upper bending roll.

Less squeezing pressure is required on the workpiece between the input rolls 95A, 95B and 95C for a given turning moment on the piece, because there are two points of frictional drive between the rolls 95B and 95C and the workpiece W. Since the tangential driving force at each driving point $m$ or $n$ (Fig. 10) is equal to the force normal to the surface at the point, multiplied by the coefficient of friction, it is obvious that the same driving torque can be obtained with one-half the normal force at each of points $m$ and $n$ (Fig. 10) than would be required of one driving roll as in former five-roll machines. Since the vertical component of each normal force must be less than the normal force itself, the reaction of the contact point D on roll 95A is less than if a single roll were opposite it. Thus the forces tending to crush the workpiece are less than in the former five-roll machines. Therefore larger, thinner-walled and softer workpieces can be handled effectively and without slippage, pinching or damage in effecting the drive of the workpiece into the bending operation.

In Fig. 11 is shown how a former machine employing two input rolls applies normal forces L over a moment arm R to build up compression and tension stresses respectively at $c-1$ and $t-1$. The stressing moment here is $L \times R$.

In Fig. 12 is shown on the left how the vertical component along line $v$ of each normal force $$\frac{L}{2}$$

is applied over a moment arm of $(R-a)$ to produce compression and tension stresses $c-2$ and $t-2$. Obviously, since the magnitude of the force along $v$ is less than $$\frac{L}{2}$$

then a force less than $$\frac{L}{2} \times (R-a)$$

is producing stresses $c-2$ and $t-2$, and this is less than would be produced by $L \times R$.

Moreover, the direct thrust along line $s$ between a point D on idler roll 95A or 97A and the point of application of load $$\frac{L}{2}$$

is less than $$\frac{L}{2}$$

and consequently less than L in Fig. 11. Since this thrust along line $s$ is exerted over moment arm $b$ to produce stresses $c-3$ and $t-3$, and this moment arm $b$ is less than the moment arm $R$ in Fig. 11, it follows that the stresses $c-3$ and $t-3$ will be less. Also, the balancing thrust along line $u$ between the points of application of loads $$\frac{L}{2}$$

must be something less than $$\frac{L}{2}$$

and is operative over a moment arm $d$, which is less than R. Then the corresponding stresses $c-4$ and $t-4$ are smaller. It will be understood that for each set of stresses $t-2$, $c-2$ and $t-3$, $c-3$, there will be an opposite identical set on the circular section as shown in Fig. 12 because of the symmetry of the roll arrangement with respect to a vertical line. The net result, as a comparison of Figs. 11 and 12 will show, is that the maximum compression and tension stresses inside and outside at any one point of any tube being straightened and which might cause the tube to crush if excessive are lower in the case of the triple input rolls of Fig. 12, than in the case of the double input rolls of Fig. 11. It will be understood that Figs. 11 and 12 also represent conditions in the discharge roll arrangements.

In Figs. 13 and 14 are shown the conditions at the bending rolls. Fig. 13 represents the condition with former machines employing one bending roll, and Fig. 14 represents the condition for our machine having two bending rolls.

Referring to Fig. 13, this indicates the manner in which the bending moment is obtained when a single roll applies the bending load G at the top. This causes the walls of the tube to expand across the horizontal plane, as indicated by the two arrows $y$ on each side of the tube. At the point of load application, the outer fibres of the tube will be in compression $c-5$, and the inner fibres will be in tension $t-5$. Opposite the point of load application the fibres will be in tension $t-6$, and will also be in tension in the direction parallel to the axis of the tube, due to the change of the cross-sectional shape of the tube. There must be sufficient load G to flex the walls of the tube so as to stretch the outer fibres opposite the point G beyond the elastic limit of the material, but this can occur only after having cancelled out the compressing action due to the increase of the horizontal diameter of the tube section. The dotted arrows symbolize how the original compressive stress $c-6$ must be removed before the stretching can take place which is requisite to a straightening action. This requires a high bending load G which limits the use of this construction to straightening tubes which, for a given hardness of material, have relatively thick walls compared to their diameters so that they act comparatively as do large bars. Conversely, for a given configuration of bar or tube, use is limited to the stronger materials.

In our arrangement of bending rolls, as shown in Fig. 14, a load on each bending roll that is less than the value G (that is, G divided by a constant factor K equal to something greater than 2 and depending entirely upon the angle of application) will produce the same bending in the workpiece. The application of the bending load at an angle to the vertical plane immediately changes the signs of the stresses at the top of the workpiece as indicated at $t-7$ and $c-7$ and likewise on the inside at the bottom, as indicated at $c-8$, so that the shape of the workpiece is maintained with practically no deformation. This transmits the bending action of $$\left(2 \times \frac{G}{K}\right)$$

as tension $t-8$ to the outer fibres, without the necessity of first overcoming compression at this point, as illustrated in Fig. 14 and above discussed.

In view of the above, it will be seen that the shape of the workpiece is maintained more truly circular in cross section as it is straightened under the dual bending rolls and that they make the deformation stresses operate in the same direction as the bending stress used to straighten the workpiece, instead of opposing it as all conventional machines (Fig. 13) now do. Obviously, the bending rolls can be adjusted with respect to each other and the periphery of the workpiece so that the points of application of the bending loads may be changed as required for the diameter of the workpiece and the nature of the material.

Summarizing then, the straightening action is accomplished with less load on the workpiece, because the outer fibres of the upper section of the workpiece are placed in tension beyond the elastic limit without having the inner fibres in tension at right angles thereto (Fig. 14), as in the case when only one bending roll is used to impose the pressure in the vertical plane (Fig. 13). Moreover, the hoop stress changes from a tension on the inside of the lower section (Fig. 13) to that of compression on the inside of the lower section (Fig. 14), thereby ensuring that the load imposed by the two bending rolls is transmitted to the outer fibres, without reduction by any compression resistance as is set up when a single pressure roll is used. Fig. 14 shows the improved stress relationship.

The three-roll feeding and discharge arrangement with the two-roll bending eliminates the sidewall overstressing that comes about from pinching action of the five-roll arrangement. When there is only one bending roll, the workpiece constantly hunts a neutral position, depending upon which way it is bent. This causes excess stresses in the side walls due to the pinching action of the conventional machine. By use of two bending rolls with tripple feed and discharge rolls, we so confine the workpiece that its axis always remains in a vertical plane, thereby eliminating this pinching action.

It is also emphasized that our two bending rolls utilize the hoop stresses to assist (rather than offset) the bending roll stresses in reaching the elastic limit in the outer surface of the workpiece, where stresses beyond the elastic limit are necessary for a straightening action.

In order that the terminology of the appended claims may be clearly understood, it is pointed out that D in Fig. 10 represents the collinear lines of contact of the idlers 95A and 97A with the stock W. The lines of contact with the stock of the bending rolls 96A and 96B lie in a common first plane D-1. This is below the collinear lines D, D. The lines of contact of the rolls 95C and 95B with the stock are in a plane D-2, and the lines of contact of the rolls 97C and 97B with the stock are in a plane D-3. Planes D-2 and D-3 are below plane D-1. In the adjustment shown in Fig. 10, the planes D-2 and D-3 are at the same elevation, but it will be understood that their elevations may differ slightly, depending upon the adjustments between the rolls 95C and 95B on the one hand, and 97C and 97B on the other hand. It will thus be seen that the plane D-1 lies between the collinear lines of contact D of the idlers on the one hand, and the planes D-2 and D-3 on the other hand.

In view of the above, it will be seen that the several objects of the invention are achieved and other advantageous results attained.

As various changes could be made in the above constructions without departing from the scope of the invention, it is intended that all matters contained in the above description or shown in the accompanying drawings shall be interpreted as illustrative and not in a limiting sense.

We claim:

1. A straightener for circular bar and tube stock, said stock having an axis, comprising a front set of three peripherally disposed skew input rolls, a first one of which input rolls is an idler located on one side of said axis and the other pair of which input rolls is located in a plane on the other side of said axis, an axially spaced rear set of three peripherally disposed skew output rolls, a first one of which output rolls is an idler located on the same side of said axis as said first input roll and the other pair of which output rolls is located in a plane on the other side of said axis, synchronized driving means for said pair of rolls of the front set and at least one roll of said pair of rolls in the rear set, a set of two peripherally disposed idling skew bending rolls located on the same side of said axis as said first idler rolls of the sets of input and output rolls and also located axially between said front input and rear output sets, means for adjusting the skew angles of the axes of all of said rolls, all of said rolls being of such approximately hyperboloid shapes that upon appropriate adjustments of the angular positions of said axes the area of contact with the stock of each roll may be made substantially a line on the surface of the stock which line is located substantially parallel to the axis of the stock, whereby the lines of contact of said bending rolls may be adjusted to lie in a common first plane, the lines of contact of said idler input and output rolls may be adjusted to be collinear, the lines of contact of the remaining pairs of rolls in the respective front input and rear output sets may be adjusted respectively to be located in planes which are parallel to but spaced from said first plane, said first plane lying between the collinear lines of contact of said input and output idler rolls on the one hand and said last-named planes on the other hand, and means whereby the lines of contact of the bending rolls may be adjusted to be circularly symmetrical with respect to the collinear lines of contact of the idler rolls and with respect to said last-named planes.

2. A straightener made according to claim 1, wherein said adjusting means is adapted to provide for substantial parallelism between the axes of such rolls in the front and rear set as may be positioned substantially axially opposite, and the axis of each bending roll may be adjusted to be nonparallel to the axis of any other roll.

3. A straightener made according to claim 1, wherein said adjusting means includes elements adapted to control the elevations of said input and output idler rolls and the bending rolls, and elements for controlling the spacing and skew angles of the bending rolls and of the remaining two rolls in each of said front input and rear output sets.

4. A straightener made according to claim 3, wherein there is included a cooperating connection between the control means for the elevation of each input and output idler and the control means for its skew angle.

References Cited in the file of this patent

UNITED STATES PATENTS

| | | |
|---|---|---|
| 748,745 | Josserand et al. | Jan. 5, 1904 |
| 1,464,702 | Fuller | Aug. 14, 1923 |
| 1,791,869 | Idel | Feb. 10, 1931 |
| 2,132,976 | Siegerist | Oct. 11, 1938 |
| 2,314,953 | Siegerist | Mar. 30, 1943 |
| 2,319,785 | Abramsen | May 25, 1943 |
| 2,323,946 | Sutton | July 13, 1943 |
| 2,376,401 | Sutton | May 22, 1945 |
| 2,411,395 | Sutton | Nov. 19, 1946 |
| 2,455,391 | Sutton | Dec. 7, 1948 |
| 2,556,120 | Sutton | June 5, 1951 |

FOREIGN PATENTS

| | | |
|---|---|---|
| 8,244 | Germany | Dec. 12, 1879 |
| 508,210 | Germany | Sept. 25, 1930 |